United States Patent [19]

Lehrer et al.

[11] 3,737,856

[45] June 5, 1973

[54] AUTOMATED OPTICAL COMPARATOR

[75] Inventors: Stanley Lehrer, Pompton Lakes; Raymond A. Robertson, Dover; John C. Holme, Wayne, all of N.J.

[73] Assignee: Electro-Optics Devices Corporation, Butler, N.J.

[22] Filed: Mar. 6, 1970

[21] Appl. No.: 17,054

[52] U.S. Cl..340/146.3 Q, 250/219 WD, 250/220 R, 250/222 R, 356/160, 356/165

[51] Int. Cl. ............................................G01n 21/22

[58] Field of Search..................................340/146.3; 250/219 WD, 220 MX, 220 M, 222 R, 223 R, 223 B; 356/141, 154, 156–160, 163–170, 206, 240

[56] References Cited

UNITED STATES PATENTS

| | | | |
|---|---|---|---|
| 3,549,896 | 12/1970 | Masino et al. | 250/219 |
| 3,479,491 | 11/1969 | Levine et al. | 235/61.11 H |
| 3,201,751 | 8/1965 | Rabinow | 340/146.3 |
| 3,309,958 | 3/1967 | Simon | 356/168 X |
| 3,529,169 | 9/1970 | Heaney et al. | 356/157 X |
| 3,519,991 | 7/1970 | Kobayashi | 340/146.3 J |
| 3,525,433 | 8/1970 | Babb | 250/223 R |
| 3,551,887 | 12/1970 | Vaccaro et al. | 340/146.3 H |

OTHER PUBLICATIONS

Stockdale, IBM Tech. Disclosure Bulletin, Vol. 8, No. 5., "Image Matching Character Recognition System," Oct., 1965. pp. 761–763.

*Primary Examiner*—Maynard R. Wilbur
*Assistant Examiner*—Leo H. Boudreau
*Attorney*—Lane, Aitken, Dunner & Ziems

[57] ABSTRACT

Apparatus for automating the determination of the dimensional measurements of an object having its silhouette displayed on an optical comparator and providing a digital representation of those measurements. The apparatus utilizes a plurality of photodetector arrays, each of which includes a plurality of photodetectors, which operate in circuit with electronic storage and comparison means to convert the output from the photocells into a digital indication of the deviation of the dimensions of the object from the dimensions of a reference part. In one embodiment, a pair of photodetector arrays are adjustably secured to a translucent viewscreen on the optical comparator. The arrays sense the position of the shadow edge of the image of the object and provide signals which indicate the location of that edge. A signal corresponding to the output from the photodetector arrays which was produced in response to the silhouette of a standard object is stored within a standard register. A signal corresponding to the output generated by the photodetector arrays for the dimensions of the object to be measured is compared with the signals stored in the standard register to provide a digital readout which represents the deviation of the object from the standard. Each of the photodetector arrays includes a plurality of photocells which are secured in a linear spaced relationship within an array housing. The housing is slidably secured to a track member attached to one side of the viewscreen. Thus, the array may be adjusted with respect to the silhouette of the object displayed on the viewscreen to accommodate a wide range of dimensions. In other embodiments, a plurality of arrays are secured to the viewscreen for multidimensional or profile measurement. Circuit means are also provided for indicating when the boundary of the object is outside of the limits of the array. Means are also disclosed for electronically focusing and for automatically positioning the array module.

19 Claims, 9 Drawing Figures

INVENTORS
STANLEY LEHRER
RAYMOND A. ROBERTSON &
JOHN C. HOLME
BY Lane, Aitken, Dunner & Ziems
ATTORNEYS Patented June 5, 1973
3,737,856
3 Sheets-Sheet 2
FIG. 5.
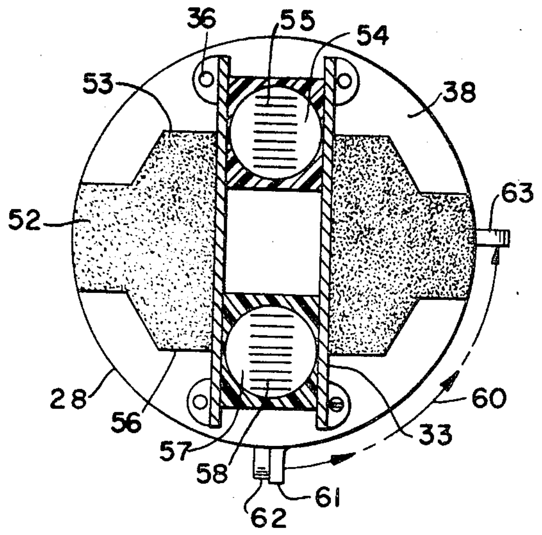
FIG. 6.
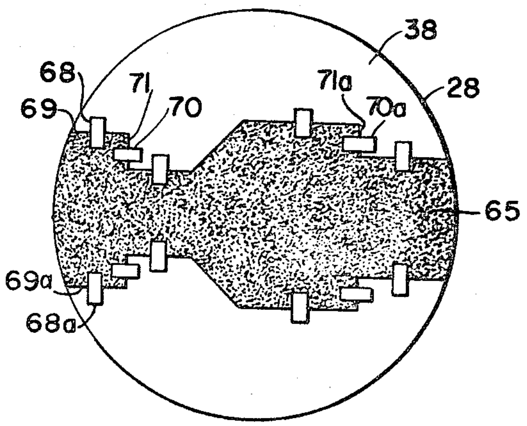
FIG. 8.
FIG. 7. FIG. 8.
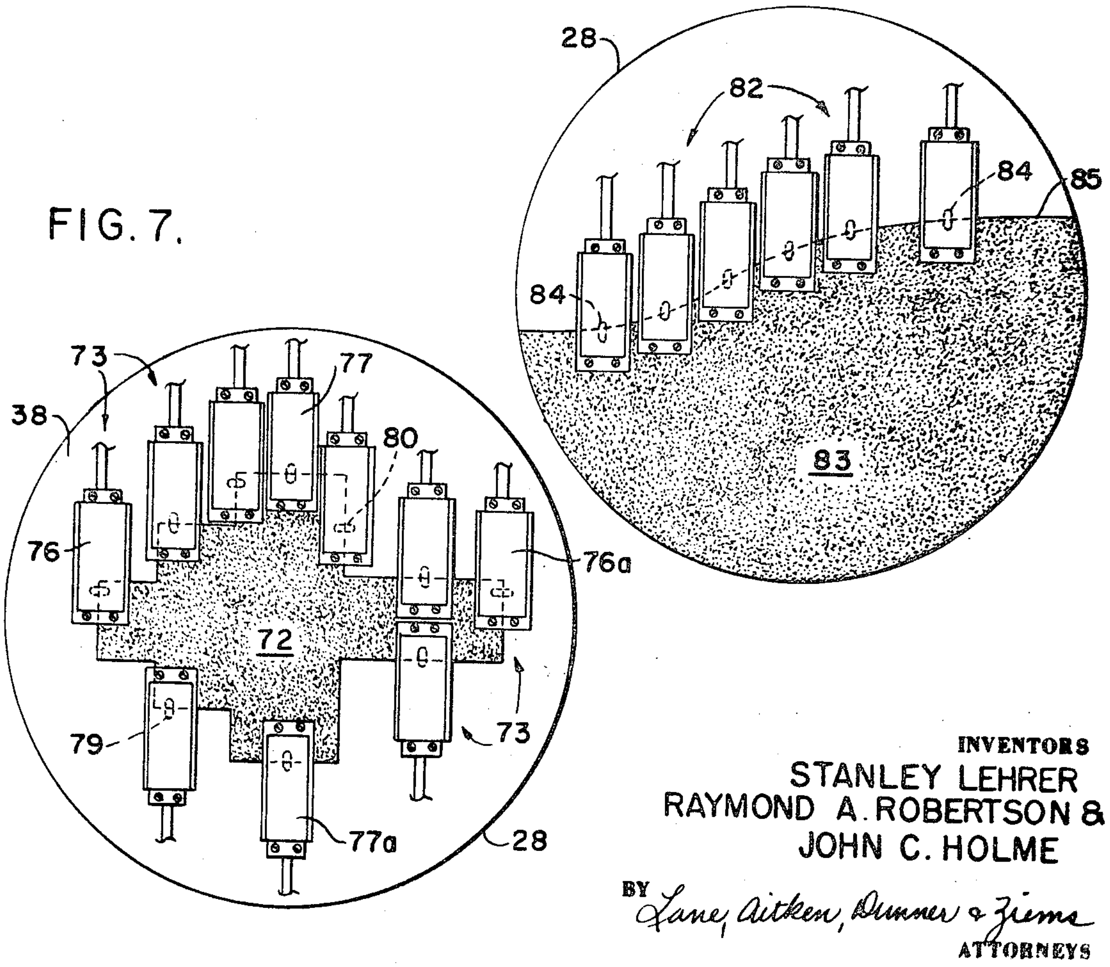
INVENTORS
STANLEY LEHRER
RAYMOND A. ROBERTSON &
JOHN C. HOLME
BY Lane, Aitken, Dunner & Ziems
ATTORNEYS INVENTORS
STANLEY LEHRER
RAYMOND A. ROBERTSON &
JOHN C. HOLME
BY Lane, Aitken, Dunner & Ziems
ATTORNEYS

AUTOMATED OPTICAL COMPARATOR

BACKGROUND OF THE INVENTION

This invention relates to an automated optical comparator. More particularly, this invention relates to an apparatus and circuit for automating the determination of the dimensional measurements of an object silhouetted on the viewscreen of an optical comparator. Still more particularly, this invention relates to an optical comparator which includes an apparatus and electronic means for providing a digital readout of the deviation of an object to be measured from the standard wherein data corresponding to the standard is stored in suitable storage circuitry.

The manufacturing arts have produced a number of devices which are aimed at minimizing the time necessary to inspect, gauge, or dimension a manufactured object. Since the use of the human eye is largely unsatisfactory for determining precision measurements, particularly with respect to small objects or where high accuracy must be provided, a number of devices have been produced to assist in making such a determination accurately and quickly.

One of the best known devices in the art is an optical comparator in which a beam of light is directed across the profile of an object to be measured. The magnified silhouette of the object is reflected upon a viewscreen of the comparator. Typically, an operator will visually determine the dimensions of the object by comparing the silhouette of the object against a dimensional grid on the viewscreen or by direct measurement of the silhouette taking into appropriate account the magnification of the comparator. An example of an optical comparator is shown in the patent to L. B. Fuller, et al., U.S. Pat. No. 2,780,956, issued Feb. 12, 1957.

The interpretation of the data pertinent to the dimensions of the part is subject to a number of inaccuracies, such as those caused by any errors of the operator in measuring the object, errors in transferring the observed dimensions to an inspection sheet, errors in calculation, and the like. Accordingly, it is an object in this art to provide means for automating the readout from an optical comparator to minimize such inaccuracies.

When it is desired to determine the tolerance of the object, or its deviation from the dimension of a standard object, another source of possible error results from the need to determine the difference between the dimensions of the object viewed and a standard object. Accordingly, it is another aim of the invention to provide means to determine the deviation of the dimensions of the inspected object from the dimensions of the standard object.

The development of solid state photocells and electronic logic circuitry has presented a generally attractive possibility for solutions to the aforesaid problems. For example, British Pat. No. 966,408 discloses an optical gauging system which utilizes a plurality of photocells attached to a viewscreen wherein the output from the photocells in used to determine the true dimensions of the object. Still other examples of gauging systems which use photocells and electronic circuitry may be found in the U.S. Pats. to: W. White, No. 3,200,801, issued Aug. 17, 1965; M. H. Westbrook, No. 3,224,322, issued Dec. 21, 1965; H. R. Rottmann, No. 3,307,446, issued Mar. 7, 1967; D. B. Foster, No. 3,365,699, issued Jan. 23, 1968; L. Patrignani, No. 3,369,444, issued Feb. 20, 1968; and E. C. Petry, No. 3,395,794, issued Aug. 6, 1968. In general, however, these approaches have neither been readily adaptable to existing optical comparators, nor have they permitted a direct determination of whether a part is within its accepted tolerance. Moreover, such circuits have not provided a direct readout of the deviation of the dimensions of an object from a standard. Thus, it is another object of this invention to achieve these additional aims.

It is another general object of this invention to reduce inspection time.

It is still another object of this invention to improve substantially the performance and capabilities of existing optical comparators.

It is an additional object of this invention to permit the use of optical comparators at normal room lighting.

It is still another object of this invention to provide an optical comparator which is capable of producing nearly instantaneous dimentional measurements at an accuracy greater than 0.0001 inches at a 50X magnification.

It is another object of this invention to provide an automated optical comparator which also permits visual inspection by an operator.

These and other objects of the invention will become apparent from a study of the detailed specification which follows taken in conjunction with the accompanying drawings.

SUMMARY OF THE INVENTION

Directed to overcoming the shortcomings of the prior art and achieving the objects of this invention, the apparatus according to the invention includes a plurality of photodetector arrays which are either adjustably or fixedly secured to the viewscreen of an optical comparator to generate an output which represents the location of the edge of the silhouette of the object to be measured. Each array includes a plurality of linearly spaced photodetectors contained within a housing member. In a preferred embodiment, a pair of photodetector arrays are adjustably secured within a track member attached to the rear of a translucent viewscreen located on the comparator. Circuit means, including multiplexer means for converting the generated signals from the photocells from parallel to serial form in conjunction with a predetermined timing sequence, are provided for processing the signals generated from the photodetector arrays. Circuit means are provided for storing data which represents the dimension of a standard object in a first, or standard register. Thereafter, data is generated by the photocells which represent the dimensions of the object to be measured for storage in a second, or parts register. Means for comparing the data stored in the standard register and in the parts register cause the actuation of means to provide a digital readout of the deviation of the dimensions of the part from the standard.

The electronic circuit according to the invention also includes a level setting circuit for receiving the multiplexed signals from the photodetectors to account for fringing effects of the silhouette and background illumination level. The output from the level setting circuit causes a pulse generating circuit to provide a signal which represents, for example, the number of unilluminated photodetectors. Circuit means are operatively associated with the pulse generating circuit for scaling the number of pulses passed therethrough, by multiplication and division circuits, in accordance with the magnification of the comparator. A programmable register selection circuit selects either the standard register or the parts register for the storage of the binary signals respectively representing the dimensions of a standard part and the measured part. The data stored in the parts register is compared with the data stored in the standard register to provide an output signal which actuates a count differential control circuit. When the count in the parts register is less than the count in the standard register, the control circuit causes additional pulses to be added to the parts register until the counts stored in the two registers are equal. When the count generated is in excess of the count stored in the standard register, the excess counts are gated to the readout device. The number of differential counts digitally represents the deviations of the measured object from the standard object. That number is displayed on a digital readout device which also indicates by a polarity signal whether the measured part was larger or smaller than the standard part.

A tilt indicating circuit interrupts the readout when the first and last photodetectors in an array are both illuminated or both darkened. That condition indicates that the edge of the silhouette of the object is outside of the linear scope of the photodetectors. Means are provided for electronically focusing the silhouette on the viewscreen and for positioning the array with respect to the viewscreen.

BRIEF DESCRIPTION OF THE DRAWINGS

In the drawings:

FIG. 5 is a cross-sectional view taken along the image plane of the viewscreen and pictorially representing the positioning of the photodetector arrays with respect to the outline of the silhouette of the object;

FIG. 6 is a representative illustration of the positioning of a plurality of arrays to measure a number of the dimensions of an irregular object;

FIG. 7 is a preferred embodiment showing the positioning of a plurality of array housings secured to the reverse side of the comparator screen wherein the edge of the silhouette of the object intersects the linear array of photodetectors;

FIG. 8 shows the representative positioning of a plurality of arrays for tracing the profile of an irregular object.

DETAILED DESCRIPTION OF THE PREFERRED EMBODIMENTS

Figure 1:
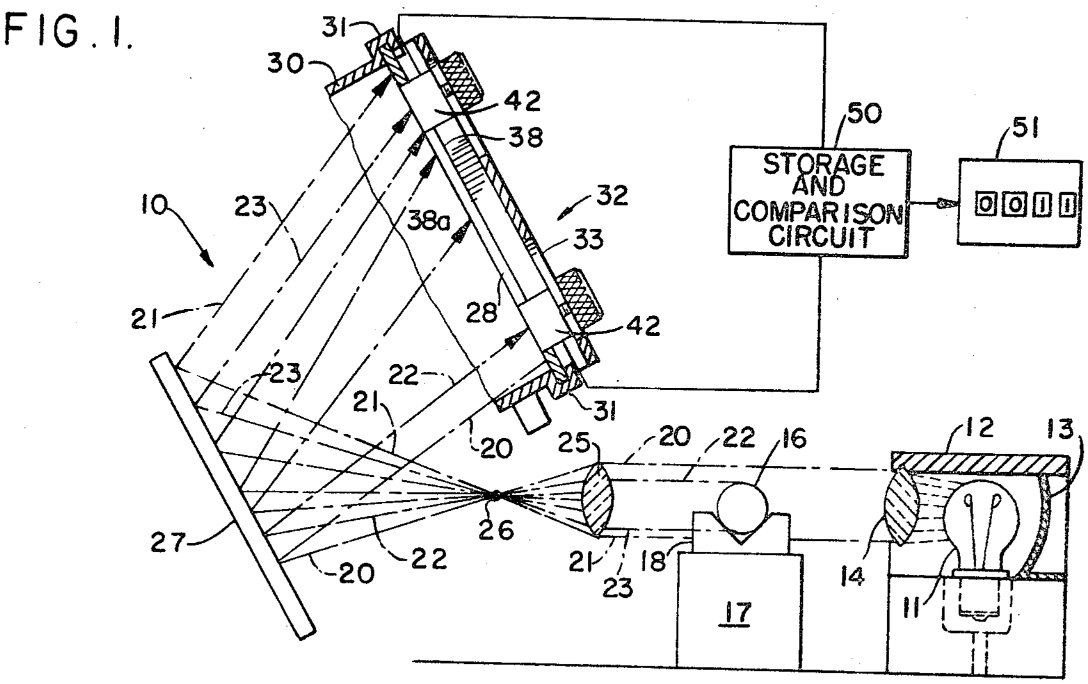
FIG. 1 illustrates the components of an optical comparator which includes the apparatus and a block representation of the circuit according to the invention.
Figure 2:
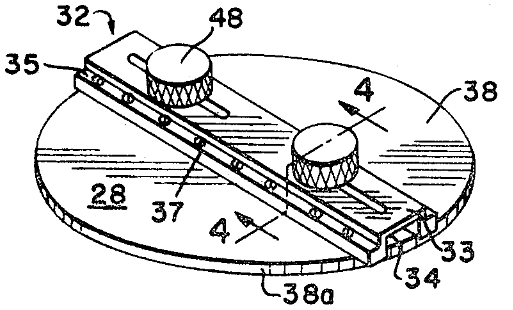
FIG. 2 shows a perspective view of the reverse side of the comparator screen illustrating the positioning of the track member for containing a pair of array housings.
Figure 3:
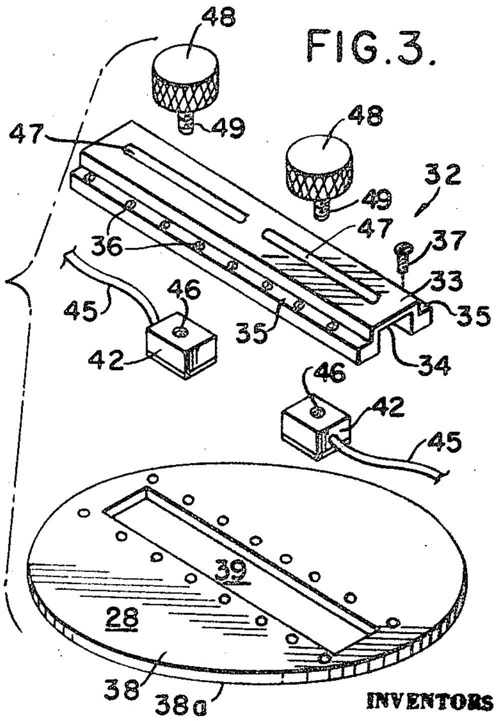
FIG. 3 is an assembly pictorial showing the viewscreen, a pair of arrays, the track member, and the securing means forming part of the apparatus of the invention.

In FIG. 1, an optical comparator is designated generally by the reference character 10. The comparator 10 comprises a source of radiant energy, such as an intense light source 11, contained within a light-projecting housing 12. A light-reflecting mirror 13 is located within the housing 12 at a position which will cause the light from the light source 11 to be reflected through the light collecting optical element 14. The optical element 14 is positioned to collect the light from the source 11 and the mirror 13 and to flood the collected light onto a target object 16. The light source may be, for example, a high-intensity tungsten source, although radiation in the non-visible range may also be used in accordance with the teachings of this invention.

A work stage 17 is located in a position forward from the focusing element 14 and includes a mounting fixture 18 for holding the object to be measured in a stable position.

For purposes of illustration, representative rays of light 20 and 21 are light rays which pass the object 16 without interruption. The rays of light designated by the reference characters 22 and 23 respectively are rays of light which are immediately adjacent to the outline of the object 16 so that the area between the rays of light 22 and 23 is dark. The rays thus identified will be followed through the comparator for purposes of illustration.

The light rays are received by an objective lens 25 which focuses the light rays through a focal point 26 and onto a folding mirror 27 to be projected onto a translucent screen 28. The mirror 27 is provided to compact the structure of the comparator 10.

The reflected rays of light, including those designated by the reference numerals 20, 21, 22, and 23 previously discussed, form a magnified and silhouetted image of the object 16 on the translucent screen 28. Thus, the darkened silhouette of the object 16 is visible on the screen between the representative rays of light 22 and 23, while an illuminated area appears on the screen 28 between the rays of light designated respectively by the pairs of numerals 21 and 23, and 22 and 20. As will be more fully explained, the edge detail of the silhouette is the operative parameter of primary interest.

The silhouetted image may be focused upon the screen 28 by adjusting the relative positioning of the screen 28 with respect to the mirror 27, or, for example, by changing the position of the mirror 27, the focal point 26, the lens 25, the object 16 or the light source 11. Regardless of the focusing technique used, for optimum application of the techniques of the invention, the projected image 16 should be reflected on the image plane of the screen 28 with a maximum amount of contrast and clarity along the edge detail of the silhouette.

The screen 28 is preferably circular for easy rotation within the clamping portion 31 of the housing 30 of the comparator. The clamping portion 31 in the embodiment shown comprises an offset, generally U-shaped member for rotatably securing the edge of the screen 28. Preferably, the surfaces 38 and 38a of the screen 28 are planar and equidistant to minimize the distortion of the light rays passing therethrough when an imperforate screen is used. Since it is a feature of this invention to permit an operator to view the image, the plane upon which the image is optimally projected, i.e., the surface 38, will be referred to in this specification as the image plane. If desired, or in the case of non-visible radiant energy, such as infra-red energy, or ultra-violet energy, the screen 28 may be eliminated, as long as the rays projected define the edge of the object to be measured. Where radiant energy outside of the visible spectrum is used, the frequency of the source of energy and the frequency of response of the detector element must be compatible.

The apparatus according to the invention is designated generally by the reference character 32. It should be understood that the invention may comprise a plurality of parts and circuit means for ready attachment to an existing optical comparator 10, or may include the complete comparator apparatus having the features and capabilities of the invention. The apparatus 32, as may be seen in FIGS. 1 through 4, comprises a track member 33 which defines a generally U-shaped channel 34. The track member 33 also includes a pair of outwardly extending flange portions 35, each of which defines a plurality of openings 36 for receiving fastening means, such as screws 37, for securing the track member 33 to the surface 38 of the screen 28. When the track member 33 is secured to the screen member 28, the U-shaped channel 34 is located substantially in register with an opening 39 defined in the viewscreen 28. The opening 39 is provided for maximum accuracy since the light rays may thus be projected upon the photodetectors without passing through the viewscreen 28.

Figure 4:
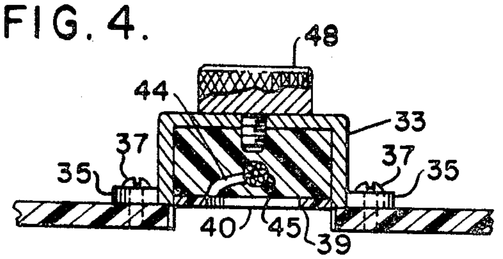
FIG. 4 is a cross-sectional view taken along line 4—4 of FIG. 2, particularly showing the positioning of the photodetector array at the image plane of the viewscreen of the comparator.

As best seen in FIG. 4, an array 40 of photodetectors is secured in an array housing 42 so that the light sensitive elements of the array 40 are located in the image plane of the viewscreen 28 adjacent to the opening 39.

Representative leads 44 are shown connected to the array 40 and merge into a cable 45 which contains the necessary input and output leads for the array 42. A number of the elements of the circuit may be provided on printed circuits, or in microminiature form, and encapsulated within the housing 42 by a suitable sealing substance.

Each housing 42 for the photodetector arrays includes a threaded recess 46 for releasably receiving the mating threaded lug 49 on a thumbscrew 48. The lug 49 projects through an elongated slot 47 defined by the track member 33. By rotating the thumbscrew 48, the array 42 is released to be positioned within the U-shaped channel 34. The extent of the adjustment is determined by the length of the slot 47. In operation, the photodetector array 42 is adjusted so that the edge of the projected silhouette of the object 16 intercepts the linear array of photodetectors 40. Preferably, the edge of the standard object is interposed to illuminate about one-half of the photodetectors and to darken about one-half of the photodetectors, to permit measurement of the maximum deviation, both high and low, of measured parts.

In operation, a standard or reference object, comparable to object 16, is positioned on the mounting fixture 18 and the data generated by the photodetector array representing either the number of photocells illuminated or the number of photocells darkened is provided on leads to a storage and comparator circuit 50. The circuit 50 stores a signal representative of the generated signal. Thereafter, an object 16 to be measured is similarly located in the mounting fixture 18 and new data responsive to the dimensions of the object are generated by the photodetector arrays on leads 49 and 48. The new data are compared with the stored data and are converted into a digital readout in the output circuit 51. The signal read out represents the deviation of the newly measured object from the standard object. The output circuit 51 may be provided to read directly in decimal inches or in binary form if a printout is desired.

The visual image of the object 16 is designated in FIG. 5 by the reference character 52. In the embodiment shown, the upper edge 53 of the silhouette 52 intercepts a first photodetector array 54 which comprises a plurality of photoconductors designated generally at 55 and which are linearly spaced at predetermined distances in the array. Similarly, the lower edge 56 of the silhouette 52 intercepts a second photodetector array 57 which comprises a plurality of photoconductors 58 arranged in a linearly spaced relationship at predetermined distances apart. Each of the arrays 54 and 57 corresponds to the array 40 shown in FIG. 4.

For convenience in measuring both vertical and horizontal dimensions, the combination of the translucent screen 28 and the track member 33 may be rotated through a 90 degree angle as indicated by the arrows designated by the reference numeral 60 in FIG. 5. A projecting member 61 is in contact with a first stop 62 when the silhouette is projected as shown. When the screen is rotated through a 90° angle, the projecting member 61 is repositioned to abut a second stop member 63. This rotational capability permits an embodiment which uses a pair of arrays such as that depicted in FIG. 5 to measure the opposed dimensions of objects where the silhouette of the object permits, or to measure either the vertical or horizontal dimensions of objects.

Preferably, each of the arrays, such as the array 54 and the array 57, comprises a linear configuration of a plurality of photodiodes. In the preferred embodiment, the photodiodes are 50 in number and are made from silicon integrated with a 51 bit shift register on a monolithic chip. Such light sensitive arrays are available from Integrated Photomatrix Ltd., Dorchester, Dorset, United Kingdom, and are described in the manufacturer's Bulletin No. TL 103. These arrays are there identified by the model designated IPL 20. As will be further explained in connection with the electronic circuit shown in FIG. 9, the shift register on the monolithic chip permits the multiplexing of the outputs of the photodiode sensors at a rate governed by an external clock circuit. In physical size, such a chip may measure on the order of less than one-quarter of an inch by less than one-twentieth of an inch. The photodiode array is housed in a flat pack having a plurality of leads emerging therefrom. The photodiodes described are responsive to a minimum acceptable light level of $5 \times 10^{-6}$ watts per $cm^2$ at a 10 kilohertz clock rate and are spaced every 0.004 inches.

In the embodiment described, each of the photodiodes 55 and 58 operates so that its internal capacitance is charged rapidly to a reverse potential by means of an electronic switch. The bias thus applied is then permitted to decay for a period of time at a rate which is a function of the incident light. At the termination of the light integration, the bias on the diode is sampled by a second switch to provide an output. With the multiplexing unit generally described, the photodiode sensors are charged and sampled in a 50 bit sequence so that all of the integration times are of equal duration. The 50 sequential samples thus provide analog or digital information relating to the illumination intensity. Further details of the operation of the associated electronic circuit are discussed in connection with FIG. 9.

FIG. 6 shows an arrangement of a plurality of photodetector arrays which are positioned on the translucent screen 28 to measure simultaneously several dimensions of the irregular contour of an object having a silhouette designated generally at 65. The embodiment in FIG. 6 also illustrates that the invention may be used to measure the size of an object projected on a screen wherein both its horizontally projected and vertically projected dimensions are simultaneously of interest. Thus, the arrays 68 and 68*a* are used to measure the dimensions between the surfaces 69 and 69*a*, while an array 70 is operative in conjunction with the array 70*a* to measure the dimension between the edge 71 and the edge 71*a*. Other pairs of arrays may be disposed with respect to the periphery of the silhouette 65 to obtain the desired information in the manner previously disclosed. In addition, the arrays of a multiple array unit such as is shown in FIGS. 6 through 8, may be either adjustable or fixed. When adjustable, a considerable latitude is permitted in adjusting the size of the array to accommodate the various sizes of the objects silhouetted.

On the other hand, it is generally preferred to secure the array to the screen 28, such as is shown in FIGS. 7 and 8, for a precise measurement of an irregular object. Thus, in the embodiment shown in FIG. 7, a plurality of array housings, designated generally at 73, are secured, such as by mounting screws 74, to the screen 28 in either horizontally disposed or vertically disposed pairs for the measurement of the silhouette 72 of the object projected. By way of example, the array 76 and the array 76*a* provide the output from which the determination of the length of the object 72 is made while the arrays 77 and 77*a* are used to determine the maximum width of the object. Other arrays are disposed in pairs on the periphery of the silhouette to determine additional dimensions. While the arrays 73 have been described in terms of horizontal and vertical dimensions, they may be positioned, in an appropriate case, to measure oblique dimensions of an object.

The photodetector elements for each of the fixed arrays 73 are illustrated in phantom outline to show their fixed positioning with respect to the outline of the silhouette 72. Representative elements are designated by reference numerals 79 and 80.

The embodiment shown in FIG. 8 illustrates still another use of the arrays of the invention when secured to the viewscreen 28. Thus, a plurality of arrays designated generally at 82 are disposed along the expected periphery 85 of the silhouetted object 83 so that the expected outline of the object intercepts each of the photodetector elements 84 of each of the arrays 82. The output from the photodetectors may be used either to determine whether the profile at the point which intercepts the array is within the range expected, or may be used to determine precisely the dimensions at that particular intersection with respect to a known reference position. Moreover, the dimensional offset between one of the arrays 82 and any one or more of the other of the arrays 82 may also be determined with the embodiment of FIG. 8.

Figure 9:
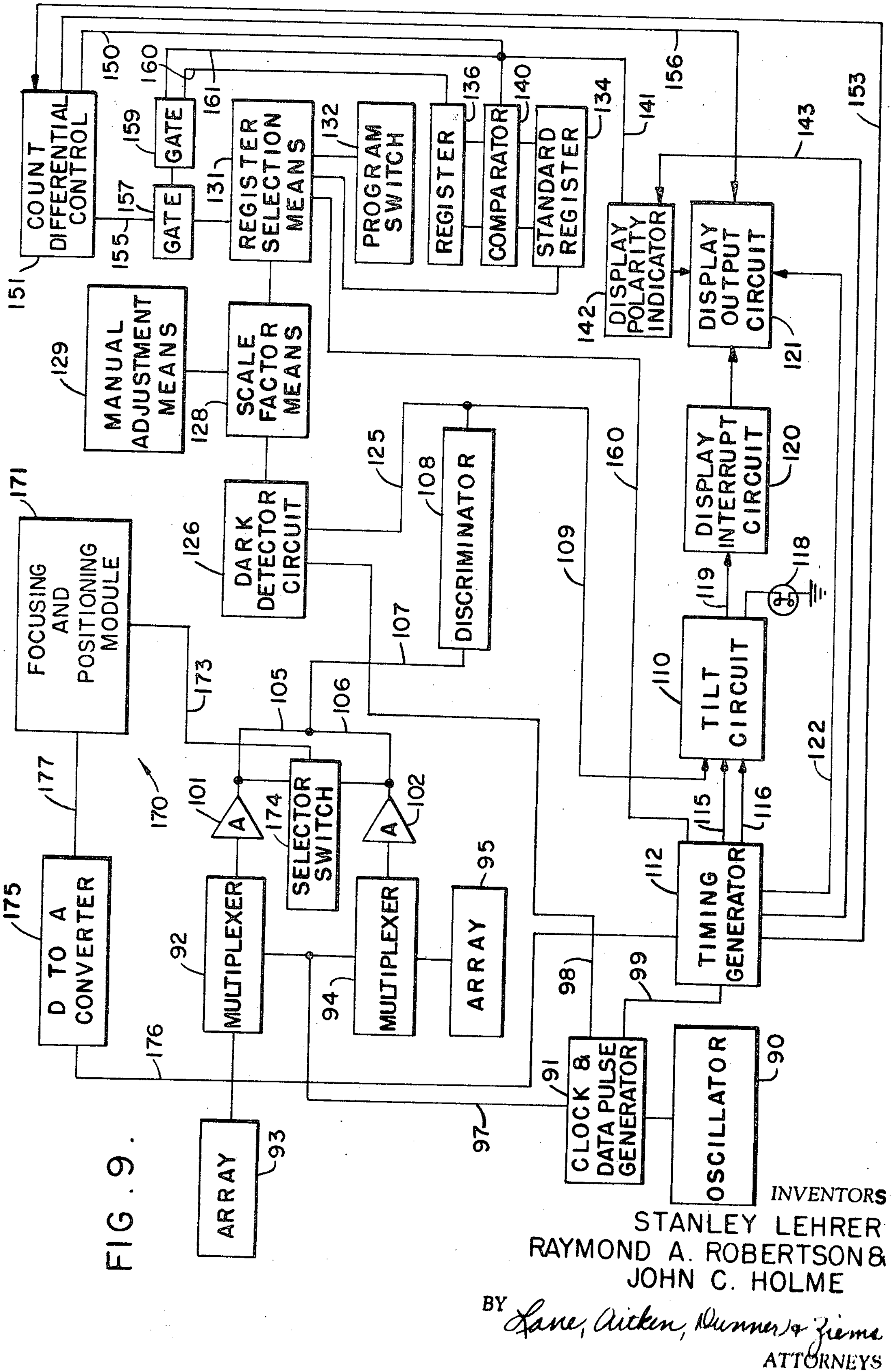
FIG. 9 is a circuit diagram in block form showing the electronic circuitry according to the invention.

A circuit which achieves the aims of the invention is shown in FIG. 9. An oscillator 90 provides a source of pulses at a high frequency, preferably, for example, in the range from 5,000 hz to 10 mhz, for operation of the circuit. The output from oscillator 90 is in circuit with the input to a clock and data pulse generator 91 to provide the required timing signals for the multiplexer 92 contained in a circuit integrated with the photodiodes in the array 93, and for the multiplexer 94 contained in a circuit integrated with the photodiodes of array 95. Clock pulses which synchronize the timing of the actions of other circuits to be discussed later are also provided on leads 98 and 99.

The clock and data pulse generator 91 generates a timing sequence comprising 51 or more bits per cycle in which the signals on lead 97, designated $0_1$ and $0_2$, are synchronized with the data pulse. The signals on lead 97 operate in a cycle in which the pulses $0_1$ and $0_2$ do not overlap.

The multiplexers 92 and 94 are integrated with the photodiodes of arrays 93 and 95 respectively. Preferably, each multiplexer is a 51 bit, 2-phase, dynamic shift register which operates to convert the outputs from the photodiodes from parallel to serial form according to the predetermined timing sequence. Both clock pulses $0_1$ and $0_2$ on lead 97 are provided to a multiplexer in a non-overlapping mode for each bit of time in the timing cycle, while the data pulse on lead 97 is about one bit wide and occurs at the beginning of each cycle. It should be noted that lead 97 may comprise a number of individual lines to accommodate the timing sequence signals and to route the signals to the proper multiplexer.

The data pulse is passed through the shift register to charge the photodiodes in sequence while a second scan of the data pulse samples each of the photodiodes to provide an analog output signal from the multiplexer which corresponds to the charge remaining on the photodiodes. A clock and data pulse generator, designated by the model number IPL 20D, is also commercially available from Integrated Photomatrix Ltd to provide the 2-phase clock pulses and the data pulses.

The multiplexers 92 and 94 are arranged to respond to the clock and data pulses so that the respective serial outputs from array 93 and array 95 are sequentially read out. Thus, the outputs from the array 93 are provided in serial form to an amplifier 101 which provides a serial output signal on lead 105, while the output signals from the array 95 are provided in serial form to an amplifier 102 which provides a output signal in serial form on lead 106.

The respective serialized signals on leads 105 and 106 are sequentially provided on lead 107 to a discriminator 108. The discriminator 108 provides an adjustment for providing a selection of the level of the analog output from the photodetectors which accounts in part for fringing effects of the viewed image and for background lighting. In those instances where the silhouette of the viewed object falls discretely between two adjacent photodetectors in the array, the output from one photodetector will be at a predetermined voltage, while the output from the adjacent sensor will be at zero volts, or at some discretely different signal level than the adjacent detector. However, in practicality, due to the fringing effects, or the lack of a clearly defined silhouette in certain instances, the first sensor may be fully illuminated, while an adjacent sensor may sense some light because the fringing effects, while a third sensor in the array will remain darkened. Thus, while the output from the first sensor is at a first predetermined level, and the output from the third sensor is at a second predetermined level, it is often desirable to provide circuit means for adjusting the analog signal level sensed for storage. Thus, the discriminator 108 has the capability of selecting a signal difference between the outputs of the photodetectors which has a predetermined magnitude.

The output from discriminator 108 is provided on the lead 109 to a tilt indicating circuit 110 which indicates that the silhouetted image does not intercept the linear array of photodetectors. In such an instance, all of the signals from the arrays 93 and 95 at the output of the discriminator 108 indicate either a light or a dark condition. When all of the signals of either array 93 or 95 are either light or dark, the tilt circuit 110 operates to interrupt the numeric display.

The tilt circuit 110 receives pulses on leads 115 and 116 from the sampling and timing generator 112 which is connected in circuit by lead 99 to the clock and data pulse generator 91. The signals on leads 115 and 116 are synchronized in time with the output signals from the clock and data pulse generator so that preselected photodetectors in arrays 93 and 95 may be sensed. The pulses on leads 115 and 116 cause the tilt circuit 110 to sample the output from the first and the fiftieth sensor for each of the upper and lower arrays 93 and 95 respectively. By way of example, when the output signals from the upper array for the first and the fiftieth photosensors are light, and the output signals from the first and fiftieth sensors on the lower array 95 are dark, this condition indicates that the silhouette is offset to preclude the circuit from operating accurately. Accordingly, the tilt indicator 110 provides both a visual output by lamp 118 and a signal on lead 119 which actuates a display interrupt circuit 120 which interrupts the numerical display on the display output circuit 121.

The display output circuit 121 may be any one of a number of types of digital readout circuits such as those which include "nixie tubes" or other devices capable of providing a digital readout of the number of pulses provided to the device or stored in a storage register.

A display update signal is provided to the display output circuit on lead 122 from the timing generator 112 to cause the display to be updated on the end of the inspection cycle.

The output from the discriminator 108 is connected by a lead 125 to a circuit 126 which generates a pulse for each unilliminated sensor which is detected. The dark detector circuit 126 also receives signals on lead 98 which are synchronized with the clock pulses from the clock and data pulse generator 91.

In operation, for a train of 50 pulses, for example, the dark detector 126 is enabled only for those photocells which remain dark. Thus, the number of pulses which are generated by the circuit 126 are equal in number to the number of dark photodetectors in each array.

In order to accommodate a wide variety of magnifications exhibited by existing optical comparators, a scale factor circuit 128 receives the output pulses from circuit 126 and, by selected multiplication and division circuits, changes the number of pulses passed therethrough so that the output may be read directly in the true dimensions. Circuit 128 thus has the capability of converting the number of pulses generated into a count, which when stored provides an accurate digital indication of the dimension of the object. For example, at a magnification of 50X the detection of 10 dark sensors is numerically equivalent to the detection of 2 dark sensors under a magnification of 10X Thus, manual adjustment means 129 are provided to set the scale factor through a choice of multipliers and dividers in accordance with the magnification of the optical comparator on which the invention is used.

The output from the scale factor circuit 128 is provided to a register selection circuit 131 which is controlled by the positioning of program switch 132. Thus, when a standard object is displayed on the work stage shown in FIG. 1, and the program switch 132 is set for standard, the register selection circuit 131 selects the standard register 134 for the storage of a number of counts representing the scaled number of sensors which remain non-illuminated. On the other hand, when an object to be measured is placed on a work stage and the program switch 132 is set in an operating position, the register selection means 131 selects a parts register 136 for the storage of data indicating the number of sensors which remain unilluminated by the display of the silhouette of the working object.

A comparator circuit 140 is connected in circuit with the parts register 136 and the standard register 134 to compare the number of counts stored in the respective registers to determine the dimensions of the object.

If the number of counts stored in the parts register is less than the number of counts stored in the standard register, this data may be physically interpreted to mean that too many photocells have been illuminated and thus, that the part is too small. Accordingly, means are provided to add counts to the parts register 136 until the counts stored in the standard register 135 and the parts register 136 are equal.

When the number of counts in register 136 is less than the number of counts in register 134, a signal is applied to the display polarity indicator 142 on lead 141. When the indicator 142 receives a signal on lead 143 from the timing generator 112 indicating that the inspection cycle is finished, the plus or minus sign on the indicator 142 is caused to be displayed. For the example described, the polarity is minus, indicating that the part is small.

Under this same condition, a signal from the comparator on lead 150 is applied to a count differential control circuit 151. A signal is also applied to the circuit 151 from the timing generator 112 on lead 153 which is synchronized with the clock and data pulses. Thus, when the sampling of the array is completed, and the number of counts in register 136 is lower than the number of counts in register 134, a like number of pulses are provided on leads 155 and 156 respectively.

The pulses on lead 155 are gated through a gate circuit 157 which is enabled when the register selection circuit 131 is set to inspect a part other than the standard part. When gate 157 is enabled, the pulses on lead 155 are passed through a gate circuit 159 to lead 160 to be provided to the parts register 136. The gate 159 is only enabled by a signal on lead 161 when the number of counts in register 136 is less than the number of counts in register 134 as determined by the comparator circuit.

Thus, counts are added to register 136 until the counts in the two registers are equal and gate 159 is disabled.

The number of pulses provided on lead 156 to the display output circuit at the end of an inspection cycle is equal to the number of pulses added to register 136 to make the counts in the two registers equal. Thus, these added counts directly represent the amount by which the part was smaller than the standard.

On the other hand, if the part is larger than the standard part, a higher number of dark photodetectors will be sensed and a count will be generated for storage in register 136 which is greater than the count stored in register 134. However, when the counts in the registers 134 and 136 are equal in number, the excess counts are provided on lead 156 to the display output circuit 121. The signals are provided when the count differential control circuit is enabled by a signal from the comparator 140 on lead 150. As before, gate 159 is disabled when the counts in registers 134 and 136 are equal so that the output from the scale factor circuit 128 are passed through gate 157 through the count differential control circuit 151 to the display output circuit 156.

A signal from the timing generator 112 on lead 160 to the register selection means 131 indicates that an integral cycle is completed.

In the event that the number of counts generated for a part is equal to the number of counts stored for the standard part, a zero is displayed to indicate that condition.

Means for electronically focusing and positioning the arrays are indicated generally at 170. The focusing module 171 comprises a cathode ray tube having its Y-drive circuit connected by lead 173 to a selector switch 174. The selector switch 174 may select the output from either of the amplifiers 101 or 102. A D to A converter 175 converts digital timing signals from the timing generator 112 on lead 176 to analog signals on lead 177 which provides the input for the X-drive circuit on the focusing module 171. As a result of these inputs an electronic representation of the shadow boundary falling on each detector array is displayed on the cathode ray tube. When the steepest transition is obtained optimum focus has been established. When the transition is centered on the display the shadow boundary falls in the center of the array. Other means for focusing the arrays such as by the observation by the operator of the output, appropriate metering, and the like may also be used.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An optical apparatus for automating the determination of the deviation from a stored reference standard of the dimensions of an object having its magnified silhouette displayed at an image plane on a screen member and providing an output signal representative of said deviation with an accuracy at least on the order of $1 \times 10^{-4}$, comprising the combination of:

first means including said screen member for defining an image plane for receiving the projected silhouette of an object to be measured, said first means receiving said magnified silhouette of said object to enhance the accuracy of said determination, a plurality of linear arrays of radiation-sensitive detectors, each of said linear arrays comprising a plurality of substantially aligned, closely adjacent, radiation-sensitive detectors spaced apart on the order of about 0.004 inches for providing a signal representative of locations of the silhouette of said object as a function of the impingement of radiation on each of said arrays of detectors, said detectors being located at said image plane, second means for securing each of said plurality of arrays of detectors substantially in said image plane; and circuit means, including memory means for storing a digital reference signal representative of the reference standard of the dimensions of said object and comparator means for comparing a digital first signal from said plurality of detectors representing the silhouette of said object with said digital reference signal, said circuit means being in operative association with each of said detectors for providing a digital signal which represents a digital comparison of said first signal produced by said plurality of detectors in response to the projection of said silhouette with said reference signal stored in said storage means.

2. The apparatus as defined in claim 1 wherein said first means includes an optical comparator of the type comprising a source of light and means for interposing an object with respect to said source of light so that a magnified image of said object is focused upon said image plane and wherein said detectors are photodetectors.

3. The apparatus as defined in claim 2 wherein said screen member is translucent.

4. The apparatus as defined in claim 3 wherein said second means includes a plurality of housing members, means for securing an array of a plurality of said photodetectors in each of said housing members, and means for securing each of said housing members to said screen member in such a manner that said photodetectors are located substantially in said image plane and are capable of determining the edge of said silhouette.

5. The apparatus as defined in claim 4 wherein said screen member defines at least one opening in register with at least one of said housing members so that portions of the edge of said silhouette are projected upon said photodetectors without passing through said screen member.

6. The apparatus as defined in claim 4 wherein said first means is further characterized in that each of said plurality of housing members is releasably secured to said screen member.

7. The apparatus as defined in claim 4 wherein said first means includes a body member and means for securing said body member to said screen member, said body member defining a recess for receiving each of said plurality of housing members.

8. The apparatus as defined in claim 7 wherein said body member further defines a slot in communication with said recess and securing means having a portion thereof located in said slot for releasably securing said housing member in said recess.

9. The apparatus as defined in claim 1 further including means for adjustably securing each of the photodetector arrays at about said image plane.

10. The apparatus as defined in claim 9 wherein said securing means comprises a member defining a channel for receiving each of said photodetector arrays and further including means for permitting the adjustment of each of the photodetector arrays within said channel.

11. The apparatus as defined in claim 10 wherein each of said photodetector arrays includes a threaded recess and said apparatus further includes a thumb screw having a threaded projecting member capable of coacting with said threaded recess, and said member defines an opening communicating with said channel for receiving said projecting member so that each of said arrays may be secured within said channel by the cooperation of said securing member and said projecting member.

12. The apparatus as defined in claim 11 wherein said screen member defines an opening which is substantially in register with said channel.

13. The apparatus as defined in claim 1 wherein each of the photodetectors arrays is arranged substantially in a planar configuration and wherein said screen member defines said image plane, the cooperation of said array and said screen member being such that the planar array of photodetectors is arranged substantially in the image plane of said screen member.

14. The apparatus as defined in claim 1 wherein each of said arrays is arranged to permit the measurement of the deviation of an irregular profile of an object from a reference standard representing said irregular profile.

15. The apparatus as defined in claim 1 further including a plurality of photodetector arrays which are fixably secured to said screen member, each of said plurality of arrays further including a plurality of photodetectors in a linear array, said plurality of arrays being arranged to permit multidimensional measurement of an object.

16. In a guaging apparatus, the combination of:

a plurality of arrays, each comprising a plurality of linearly spaced, closely adjacent photodetectors for providing a first plurality of signals representing the location of a projected magnified silhouette of an object, said photodetectors being spaced apart on the order of 0.004 inches, means for receiving said first plurality of signals and providing a first digital signal representative thereof, said first digital signal being represented by a first number of counts, means for storing a second digital signal representative of the dimensions of a standard object in a first register, said second signal being represented by a second number of counts, means for storing said first signal representative of the dimensions of an object to be measured in a second register, wherein said means for storing said signals includes multiplexing means in circuit with each of said arrays of photodetectors for converting the outputs from said plurality of arrays of photodetectors from parallel to serial form, a source of clock pulses, and means in circuit with said source of clock pulses and said multiplexing means for controlling the readout sequence from each of said plurality of arrays of photodetectors, means for comparing said first signal stored in said second register and said second signal stored in said first register to provide a representation of the quantitative difference therebetween, means for introducing a number of counts in the second register to make the number of counts stored in each of said first and second registers equal, and means in circuit with said comparing means for providing a digital readout of the quantitative difference between said first signal and said second signal, the last named means further including control means for providing counts to a display output which corresponds to the number of counts added when the number of counts in said second register is less than the number of counts in said first register to make said register equal, and which corresponds to the number of counts generated which are in excess of the number of counts in said first register when said second signal generates a count greater than the count in said first register.

17. The circuit as defined in claim 16 further including means for electronically focusing the image projected on said plurality of arrays of photodetectors.

18. The circuit as defined in claim 16 further including means for indicating that the edge of the projected image of the object to be measured is outside of the lateral extent of at least one array of photodetectors.

19. The circuit as defined in claim 16 further including means for interrupting the digital readout when the outline of said object does not intersect at least one of the arrays of photodetectors.

* * * * *